Patented Dec. 13, 1938

2,140,291

UNITED STATES PATENT OFFICE 2,140,291

CALCIUM COMPOUND AND COMPOSITION SUITABLE FOR HYPOCALCEMIA ALLEVIATION

Glenn L. Jenkins, Baltimore, Md., assignor to Pitman-Moore Company, Indianapolis, Ind., a corporation No Drawing. Application June 8, 1936, Serial No. 84,168

12 Claims. (Cl. 167—68)

This invention relates to calcium therapy and more especially to products containing calcium and the production thereof.

Various products containing a high percentage of calcium salts in solution have been devised and produced but none which include the high percentages in stable solution obtained with this invention and which invention is further characterized by the salient features that certain of the products are no more objectionable therapeutically (as to irritation and toxicity when administered in equivalent amounts) than the present well known and standardized calcium products for the alleviation of hypocalcemia, or so-called supersaturated solutions for the same purpose, which products of this invention remain relatively stable in solution for long periods of time,—in some instances, certain products remained stable for more than a year and still remain stable; that is, do not precipitate upon standing,—while certain forms of the invention can be held in a solution of dextrose and/or water, as preferred, and which products appear to have a marked resistance to mold growth.

This invention is also directed to supersaturated calcium solutions containing a soluble calcium salt of $[R(SO_3)x]_yCa_z$ type.

This invention is also directed to the use of a calcium product which increases the solubility of certain calcium salts of the carboxylic group, possibly resulting in a double salt in substantially equi-molar proportions.

This invention is also directed to the use of calcium methionate alone or in combination with other products as a medicinal agent in the alleviation of hypocalcemia.

The present invention, when administered in equivalent amounts, has a toxicity approximately equal to that of supersaturated solutions of calcium gluconate and less toxicity than calcium chloride and calcium lactate solutions. Also, the present invention may carry the concentration when desired to an equivalent of 80% of calcium gluconate and, furthermore, is much more stable than the 40% calcium gluconate solution before mentioned.

Furthermore, when two or more substances are required to secure a stable supersaturated solution of calcium salts, the substances used to stabilize the solution are calcium-containing products which increase the calcium content of the solution.

This invention includes all the advantages of the desirable features of the prior art with little or none of the disadvantages thereof.

When the basic invention, calcium methionate, was tested upon dogs, intra-muscular injections produced no appreciable difference in irritation from that when the usual equivalent calcium gluconate injection was used, and less irritation than equivalent injections of calcium chloride or calcium lactate. Also, when the calcium methionate was injected intravenously in rabbits, no appreciable difference in the coagulation rate was observed from that obtained with the equivalent calcium gluconate injection when used as a comparison.

When the calcium methionate was tested upon dogs in comparison with calcium gluconate and calcium chloride, the increase in blood calcium per 100 cc. was 3.3 mg. for methionate form of the calcium product, 2.55 mg. for the gluconate and 2.45 for the chloride.

The basic product of the invention, calcium methionate, has a slightly acrid taste to the human tongue. It is more specifically designated as the calcium salt of methane disulfonic acid.

When calcium methionate is combined with calcium gluconate and/or calcium salts of other carboxylic acids, extremely stable and highly concentrated solutions are possible, for example, a 20% solution containing 10% of calcium methionate and calcium gluconate when held at 4° C. for 24 hours shows no crystallization whatsoever.

Although reference is made hereinafter more particularly to calcium gluconate combined with calcium methionate and also with calcium levulinate, calcium lactate, calcium saccharate, calcium mannonate or calcium lactobionate and other calcium salts of carboxylic acids, these compounds may be considered as individual substitutes either in part or in whole, each for the other, in such a combination or in such combinations.

The invention contemplates the therapeutic use in the treatment of hypocalcemia by oral or hypodermic administration of the soluble calcium salt of the mono, di, tri or polysulfonic acids of alkyl, aryl or heterocyclic, or substituted alkyl, aryl or heterocyclic organic compounds.

The formula may be broadly indicated as follows:

$[R(SO_3)x]_yCa_z$ wherein R may be an alkyl, aryl or heterocyclic or a substituted alkyl, aryl or heterocyclic group, such as methyl, methylene, methenyl, ethyl, hydroxy-ethyl, propyl, isopropyl, hydroxy-propyl, phenyl, hydroxy-phenyl, carboxy-phenyl, tolyl, pyridyl, thiophenyl or other organic radical in which any or none of the hydrogens are substituted by other elements or radicals, and wherein (SO₃) may be one or more sulfonic groups attached to one or more carbon atoms of the group represented by R and wherein Ca$_x$ may be one or more atoms of the element calcium required to form a salt. These salts, however, must be soluble. The salt may be anhydrous or hydrated.

Salts prepared and tested have been derived chiefly from alkyl groups containing one or more sulfone groups such as the readily soluble calcium salt of methane disulfonic acid $$CH_2(SO_3)_2Ca.3H_2O,$$

the calcium salt of ethyl sulfonic acid $$(C_2H_5SO_3)_2Ca.2H_2O;$$

the calcium salt of 1,2 ethane disulfonic acid, $C_2H_4(SO_3)_2Ca$; the calcium salt of 1,1 ethane disulfonic acid, $C_2H_4(SO_3)_2Ca$; the calcium salt of 1,2 propane disulfonic acid, $C_3H_6(SO_3)_2Ca$; the calcium salt of 1,2,3 propane trisulfonic acid $[C_3H_5(SO_3)_3]_2Ca_3$; or from aryl groups such as the calcium salt of benzene sulfonic acid, $$(C_6H_5SO_3)_2Ca$$

and hydroxy benzene sulfonic acid, $$(C_6H_4.OH.SO_3)_2Ca,$$

or from heterocyclic groups such as the calcium salt of pyridine sulfonic acid, $(C_5H_4NSO_3)_2Ca$ and the calcium salt of thiophene sulfonic acid, $(C_4H_3S.SO_3)_2Ca$.

The best of these specific salts has been determined to be calcium methionate. This determination was based on tests for toxicity, irritant action and increase of blood calcium per unit dosage.

One method of producing this preferred salt, by way of illustration only, is as follows: One mole of methylene chloride, $CH_2Cl_2$, and 2 moles of potassium sulfite, $K_2SO_3$, and 400 cc. of water are heated together in an autoclave at about 150° to 175° C. and constantly agitated. The heating is continued until the pressure which rises from 15 to 30 atmospheres decreases to from 0 to 2 atmospheres. The contents when removed are cooled, yield crystalline potassium methionate. The yield is 75 to 90%. This salt dissolved in water is acidulated with hydrochloric acid. Saturated barium chloride solution is added in slight excess. The barium methionate precipitated is washed with cold water and then added in the form of a suspension to an equivalent amount of sulfuric acid dissolved in a large volume of water. The mixture is heated and stirred until no test for sulfate is obtained in a portion of the precipitate. The free methionic acid is filtered from the precipitated barium sulfate, concentrated to a small volume and converted to the calcium salt by the addition of calcium oxide, calcium hydroxide or calcium carbonate. Sodium sulfite, cheaper than potassium sulfite, has been used therefor with the resulting economy and no apparent sacrifice of yield.

The calcium salt may then be crystallized or precipitated from solution by the addition of alcohol.

It is white and crystalline. It is stable in air and on boiling. It crystallizes with 3 molecules of water and loses two of these when dried to constant weight at 100° C. and all of its water of crystallization when dried to constant weight at 160° C.

32.5 gm. of the anhydrous salt or 44.45 gm. of the hydrated salt will dissolve in 100 cc. of water at 25° C. The calcium content of the anhydrous salt, weight to weight is approximately 18.69% and of the hydrated salt 14.9%.

Calcium methionate produced as above and dried to constant weight at 100° C. tested negative for sulfate and chloride. At 180° C. the moisture content was 6.55%. The calculated calcium was 17.24% and when tested 17.12% and 17.16% were found. The molecular weight was 232. 40 gm. dissolved in 100 cc. of water formed a clear solution. Each 232 gm. has a calcium content equivalent to that in 448 gm. of calcium gluconate. Thus, if the degree of solubility for both were the same approximately 50% more calcium would be present in a solution of calcium methionate than would be present in a calcium gluconate solution, weights of each compound in solution being approximately the same.

By thus describing a specific procedure for the formation of calcium methionate, it is to be understood, the invention is not limited thereto for other methods of its production have been employed. Similar methods may, whenever suitable, be employed to form the other soluble calcium salts of the sulfonic acid groups without departing from the scope of this invention.

Supersaturated solutions of calcium methionate and calcium lactate, or calcium methionate and calcium gluconate, when properly prepared, appear to be permanent and in higher concentrations inhibit mold growth.

It has been found desirable that the solutions of these salts prepared with the aid of heat be filtered free of all extraneous matter and into bottles free from flaws. Ampuled solutions remain stable. Solutions in stoppered bottles may not remain stable in some cases, undoubtedly due to "seeding" in the bottles, this being a fault in mechanical procedure and not of the product per se.

The following solutions were prepared and remained without signs of precipitation for thirty-six days:

(a) A solution of 5 gm. calcium methionate and 10 gm. calcium gluconate plus sufficient water to make 100 cc.

(b) A solution of 10 gm. calcium methionate and 10 gm. calcium gluconate plus sufficient water to make 100 cc.

(c) A solution of 15 gm. calcium methionate and 10 gm. calcium gluconate plus sufficient water to make 100 cc.

(d) A solution of 15 gm. calcium methionate and 15 gm. calcium gluconate plus sufficient water to make 100 cc.

(e) A solution of 20 gm. calcium methionate and 15 gm. calcium gluconate plus sufficient water to make 100 cc.

(f) A solution of 20 gm. calcium methionate and 20 gm. calcium gluconate plus sufficient water to make 100 cc.

(g) A solution of 30 gm. calcium methionate and 10 gm. calcium gluconate plus sufficient water to make 100 cc.

(h) A solution of 30 gm. calcium methionate and 20 gm. calcium gluconate plus sufficient water to make 100 cc.

Item (a) remained stable for at least six months. Item (d) remained stable for at least 72 days. Items (b), (c), (e) and (g) remained stable for more than a year. All were water solutions.

Since, as previously set forth, the calcium content in the methionate is approximately twice that in the gluconate for equal weights of the salts, in example (h) we find a solution containing an amount of calcium equivalent to an 80% solution of calcium gluconate.

Higher equivalency may be possible but same has not been prepared and tested.

It appears certain that the calcium methionate does increase the stable solubility of the calcium gluconate.

It also is apparent that almost any desired weight to volume might be obtained as necessity may dictate. Calcium percentages noted in prior patents and herein refer to the grams of calcium salt dissolved in 100 cc. of water, thus, a 10% solution is 10 grams in 100 cc. of water.

It is, therefore, theoretically possible to obtain the equivalent of an approximately 100% calcium gluconate solution by using 40 gm. of calcium methionate and 20 gm. of calcium gluconate or 35 gm. of calcium methionate and 30 gm. of calcium gluconate.

Note, as before set forth, 40 gm. of calcium methionate will dissolve in 100 cc. of water to form a clear solution.

It may also be possible to obtain a percentage greater than 100 in certain instances.

No opinion, however, is expressed as to the therapeutic value of such high concentrations, their toxicity, rate of blood coagulation, irritation or necrosis and the like. Should there be an increase in irritant action this, tests show, may be reduced by slowing down the rate of injection as by using finer injection needles, since the solution per unit volume contains more calcium.

Double salts of equimolar character will yield stable solutions, for example: 112 gm. of calcium gluconate and 58 gm. of calcium methionate dissolved in water and evaporated to dryness yielded a salt containing in each gm. 0.1176 gm. of calcium equivalent to 1.27 gm. of calcium gluconate. 15.4 gm. of calcium lactate and 11.6 gm. of calcium methionate dissolved in sufficient water and subsequently evaporated yielded stable concentration up to 20%.

From tests, it has been determined that a slight excess of calcium methionate increased the stability of the solution, also that calcium methionate from 0.5% to 30% increases the stability of calcium gluconate solutions and of solutions of other calcium salts of carboxylic acids.

For illustrative purposes only, a double salt of calcium methionate and calcium gluconate can be prepared as follows: Dissolve equimolecular quantities of calcium methionate and calcium gluconate in water and evaporate to dryness or precipitate by the addition of alcohol to 75%, for example, dissolve 112 gm. of calcium gluconate and 58 gm. of calcium methionate in 300 cc. of water with the aid of heat, filter from any trace of sediment (possibly a little calcium oxide or carbonate from the gluconate) and evaporate to dryness; or concentrate to a syrupy consistence at a volume of about 100 cc. and add 95% alcohol, 300 cc., collect the precipitate and dry. Each gram of the dry precipitate is equivalent in calcium content to 1.27 gm. of calcium gluconate.

For illustrative purposes only, a double salt of calcium methionate and calcium lactate can be prepared as follows: Dissolve equimolecular quantities of calcium lactate and calcium methionate in water with the aid of heat, cool, filter, and evaporate to dryness, for example; dissolve 1/10 mole, 30.83 gm. of calcium lactate and 1/10 mole of calcium methionate, 23.20 gm. in 200 cc. of water, allow to cool, filter, and evaporate to dryness. A gummy residue results having a faint yellow color yielding a white powder when dried.

The stability of the solutions just mentioned and of solutions of higher concentrations is increased by the presence of a slight amount of calcium methionate over the amount required for double salt formation.

The solution of the double salt of methionate and gluconate just mentioned remained stable for at least six months.

The solution of the double salt of methionate and lactate just mentioned remained stable 48 days for a 20% solution and a 10% solution remained stable for over one year. Other solutions which remain stable for relatively long periods of time, but which are given merely by way of example are as follows:

A solution of 5 gm. of calcium methionate, 5 gm. of calcium gluconate, 10 gm. of c. p. dextrose in sufficient water to make 100 cc.;

A solution of 10 gm. of calcium methionate, 5 gm. of calcium gluconate, 10 gm. of c. p. dextrose in sufficient water to make 100 cc.;

A solution of 6.1 gm. of calcium methionate, 6.1 gm. of calcium gluconate, 23.5 gm. c. p. dextrose in sufficient water to make 100 cc.; and A solution of 5 gm. of calcium methionate, 5 gm. calcium lactate, 20 gm. c. p. dextrose in sufficient water to make 100 cc.

For illustrative purposes, there was prepared a solution of 26 gm. of calcium gluconate and 26 gm. of calcium methionate with 100 grams of c. p. dextrose. This was dissolved in sufficient water to make 425 cc. and placed in amber colored bottles of ordinary glass. These were chilled and shaken daily and no signs of precipitation or crystallization appeared during the first ninety days and these solutions still remain clear.

From the above, it is also apparent that where dextrose is desired as a part of the medication, it can be utilized.

It has also been determined that for subcutaneous or intravenous injection, calcium methionate alone or in combination is suitable as compared to calcium gluconate medication and the other calcium compounds disclosed herein are approximately in the class of calcium chloride and calcium lactate when used alone. When combined as aforesaid, however, their suitability approaches that of calcium gluconate.

Since calcium methionate is more highly ionized than calcium gluconate, it is to be expected that the calcium level of the blood will be built up much more rapidly than heretofore. It is believed a slower rate of injection would compensate for any ill effects resulting from such higher degree of ionization. Care, however, must be taken in preparing dosages bearing in mind that a 20% methionate solution contains approximately double the calcium contained in a 20% gluconate solution. Thus, the dosage must be varied according to the concentration, the size of the animal or individual and the calcium reaction of the same.

A solution of calcium gluconate and calcium methionate was accidentally subjected to a temperature of approximately minus 20° C., and froze and, upon warming, becoming clear and, upon standing for seven days, the salt did not precipitate, which is further evidence of the stability of such a solution and its acceptability as a commercial product. This insures that such a solution, if subjected to freezing within the ordinary freezing range encountered in the commercial world that the product does not suffer thereby. In other words, when heated to again form a solution, all of the soluble salts in the original solution remain in solution so that the potency of the product is not changed.

By the terminology "acid group means", it is intended to inslude an acid group or acid groups. By the terminology "organic radical means", it is intended to include one or more radicals of the alkyl, aryl or heterocyclic group. By the terminology "calcium salt means", it is intended to include a calcium salt or calcium salts. By "ordinary temperatures", it is intended to include from 15° to 40° C. By "stability of the solution", it is intended to include a time interval of not less than 24 hours, and usually one greater than 30 days. For hospital use, the former interval is sufficient. For physician's use, the latter interval is sufficient.

While the invention has been described in great detail in the foregoing, the same is to be considered as illustrative only and not restrictive in character. Various modifications have been mentioned herein, some in greater detail than others, but all such modifications, as well as those which will readily suggest themselves to persons skilled in this art, are all considered to be included within the broad scope of the invention, reference being had to the appended claims. Furthermore, it is to be observed that certain calcium salts of the higher sulfuric acid type, such as $R(SO_4)_x$ are insoluble and calcium salts of the lower sulfuric acid type $R(SO_2)_x$ are relatively unstable, and apparently each of such salts have little or no solution stabilizing value and such salts are specifically disclaimed, the claims being so worded as to exclude said salts from the scope thereof.

The invention claimed is:

1. As a new composition of matter, a solution stable at ordinary temperatures including calcium gluconate and a calcium salt of methane disulfonic acid.

2. As a new composition of matter, a solution stable at ordinary temperatures including a calcium salt of a carboxylic acid and a calcium salt of a low molecular weight alkyl sulfonic acid containing at least two sulfonic acid groups attached to one carbon atom.

3. As a new composition of matter, a solution stable at ordinary temperatures including calcium gluconate and a calcium salt of methane disulfonic acid, and having a calcium content greater than the equivalent of 40% calcium gluconate and having the therapeutic functions thereof.

4. As a new composition of matter, a solution stable at ordinary temperatures including a calcium salt of a carboxylic acid and a calcium salt of a low molecular weight alkyl sulfonic acid containing at least two sulfonic acid groups attached to one carbon atom, and having a calcium content greater than the equivalent of 40% calcium gluconate and having the therapeutic functions thereof.

5. The calcium salt of 1,2-propane disulfonic acid.

6. The calcium salt of 1,2,3-propane trisulfonic acid.

7. As a new composition of matter, a solution stable at ordinary temperatures including a calcium salt of a carboxylic acid and a calcium salt of a low molecular weight alkyl sulfonic acid containing at least two sulfonic acid groups.

8. As a new composition of matter, a solution stable at ordinary temperatures including a calcium salt of a carboxylic acid and a calcium salt of a low molecular weight alkyl sulfonic acid containing at least two sulfonic acid groups, and having a calcium content greater than the equivalent of 40% calcium gluconate and having the therapeutic functions thereof.

9. As a new composition of matter, a solution stable at ordinary temperatures including calcium gluconate, and a calcium salt of a low molecular weight alkyl sulphonic acid containing at least two sulphonic acid groups.

10. As a new composition of matter, a solution stable at ordinary temperatures including calcium gluconate, and a calcium salt of an alkyl sulphonic acid.

11. A soluble calcium salt suitable for therapeutic purposes and having the properties described and the formula $[R(SO_3)_x]_y Ca_z$, where $x$, $y$ and $z$ are each integers, $x$ is greater than unity and $y$ is 1 or 2 as $x$ is even or odd, respectively, and $z$ is one-half the product of $x$ and $y$, and R is an alkyl radical containing more than two carbon atoms and of relatively low molecular weight.

12. As a new composition of matter, a solution stable at ordinary temperatures including calcium gluconate, and a calcium salt of a low molecular weight alkyl sulphonic acid.

GLENN L. JENKINS.